United States Patent [19]

Miyake et al.

[11] Patent Number: 4,802,020

[45] Date of Patent: Jan. 31, 1989

[54] VARIABLE MODE ELECTRONIC STILL CAMERA INCLUDING OPTICAL AND ELECTRONIC VIEW FINDERS

[75] Inventors: Isumi Miyake; Kiyotaka Kaneko; Masahiro Konishi, all of Tokyo; Motohiko Horio; Kazutsugu Ogata, both of Oomiya, all of Japan

[73] Assignees: Fuji Photo Film Co., Ltd.; Fuji Photo Optical Co., Ltd., both of Japan

[21] Appl. No.: 918,910

[22] Filed: Oct. 15, 1986

[30] Foreign Application Priority Data

Oct. 19, 1985 [JP] Japan ................................ 60-234175
Oct. 19, 1985 [JP] Japan ................................ 60-234176
Oct. 19, 1985 [JP] Japan ................................ 60-234177

[51] Int. Cl.⁴ .......................................... H04N 5/781
[52] U.S. Cl. ........................... 358/342; 358/906; 358/909; 360/35.1
[58] Field of Search .............. 360/35.1; 358/335, 244, 358/342, 906, 909, 225, 33.1

[56] References Cited

U.S. PATENT DOCUMENTS

| | | | |
|---|---|---|---|
| 4,363,051 | 12/1982 | Maeda et al. | 358/335 X |
| 4,447,837 | 5/1984 | Hirata et al. | 358/335 X |
| 4,531,164 | 7/1985 | Maeda et al. | 358/906 X |
| 4,544,959 | 10/1985 | Kozuki et al. | 358/906 X |
| 4,570,188 | 2/1986 | Ichiyanagi | 358/906 X |
| 4,571,627 | 2/1986 | Stempeck | 358/906 X |
| 4,604,668 | 8/1986 | Lemelson | 358/906 X |
| 4,626,918 | 12/1986 | Morisawa | 358/225 |
| 4,677,489 | 6/1987 | Nishimura | 358/225 X |

Primary Examiner—Raymond F. Cardillo
Assistant Examiner—W. R. Young
Attorney, Agent, or Firm—Parkhurst, Oliff & Berridge

[57] ABSTRACT

The present invention is concerned with an electronic still camera for photographing a subject by use of an image sensing device such as a solid state image sensing device and the image signal thereof is recorded into a rotary recording medium such as a magnetic disc. With this electronic still camera, photographing in an electronic view finder (EVF) mode and a movie still mode in addition to a normal mode can be performed. The EVF mode is the mode for making exposure of the image of the subject to the normally open image sensing means by use of an electronic finder to observe the subject, and subsequently, releasing an exposure device for a period of time required for the exposure to make exposure of the image of the subject to an image sensing device. The movie still mode is the mode for steadily rotating a spindle motor in synchronism with a synchronous signal generator, outputting a video signal to the outside through an interface and recording a still image into the rotary recording medium in response to an exposure command.

6 Claims, 8 Drawing Sheets

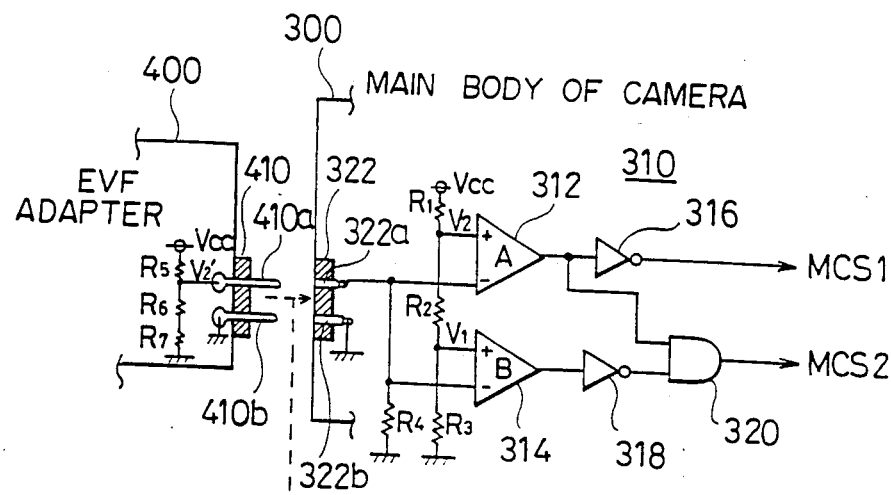
FIG. 5
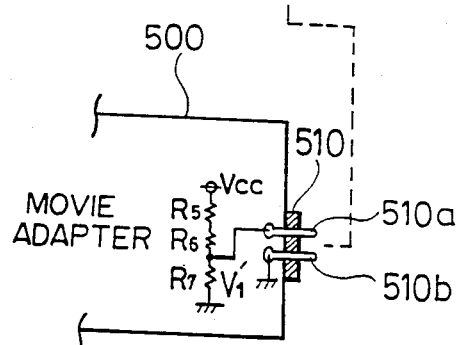
FIG. 6
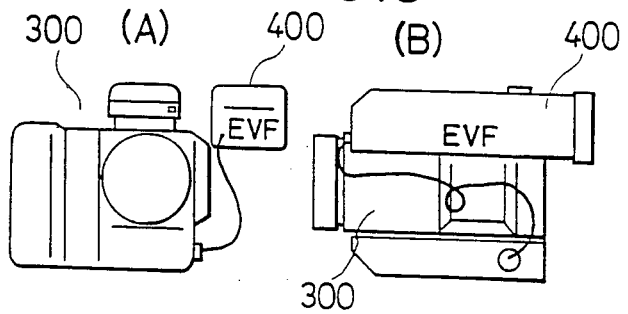
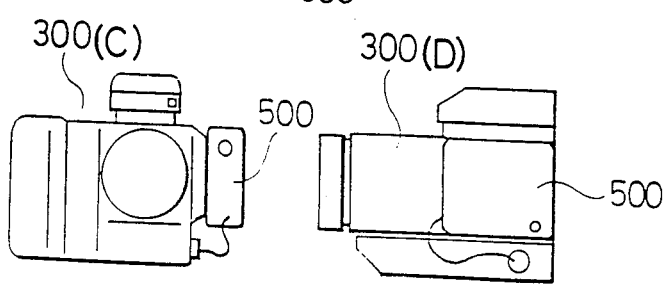

VARIABLE MODE ELECTRONIC STILL CAMERA INCLUDING OPTICAL AND ELECTRONIC VIEW FINDERS

BACKGROUND OF THE INVENTION

1. Field of the invention

This invention relates to electronic still cameras, and more particularly to an electronic still camera wherein a subject is photographed by an image sensing device such as a solid state image sensing device and an image signal thereof is recorded into a rotary recording medium such as a magnetic disc.

2. Description of the Prior Art

Recently, there has been developed an electronic still camera system wherein an image sensing device such as a solid state image, sensing device or an image pickup tube is combined with an inexpensive recording device using a magnetic disc as a recording medium and yet having a comparatively high memory capacity, wherein a subject is still-photographed electronically and recorded into a rotating magnetic recording medium, and the reproduction of an image is carried out by a television system, a printer and the like, which are provided separately.

In the above-described electronic still camera, an optical finder is used as a finder. When a subject is photographed by use of an electronic still camera, with the subject being identified by the optical finder, image information of the subject recorded on a recording medium such as a magnetic disc does not actually coincide with subject information recognized by the naked eye through the optical finder due to the characteristics of the solid state image sensing device such as a charge coupled device (CCD) or due to the limit in the number of the picture elements of the solid state image sensing device. As a consequence, when a photographer looks at a reproduced image, normally he has a feeling of unusualness to an extent.

On the other hand, in contrast to the optical finder, there is an electronic view finder which electrically displays an image of the subject on a display screen by use of the image information of the subject recorded on the recording medium.

As a consequence, the image of the subject identified by the electronic view finder is identical with an image reproduced from the image information actually recorded into the recording medium, so that the image of the subject recorded can be identified as it is by the finder.

However, the electronic view finder has such drawbacks that it needs an adapter for the specific purpose, and is expensive as compared with the optical finder. Accordingly, if such an arrangement of the electronic view finder mountable to the electronic still camera equipped with the optical finder is used, then it will be very convenient.

Furthermore, when the electronic still camera is equipped with an adapter to be converted into a system for use as a movie camera, such an arrangement should be adopted that a movie adapter as an interface to the main body of the camera is equipped, whereby a photographing mode is changed over from a normal mode for still-photographing by use of the optical finder to a movie camera mode for photographing by use of the electronic still camera as a movie camera.

There has heretofore been the conventional electronic still camera which permits photographing in the normal mode and the movie camera mode. However, there has been no electronic still camera, wherein, during photographing, the normal mode can be changed over to a movie still mode for still-photographing by use of the electronic still camera equipped with the movie adapter and for outputting the video signal thereof to the outside.

Further, in the conventional electronic still camera, start of a spindle motor as being means for rotatably driving a rotary magnetic recording medium such as a magnetic disc is performed by a release switch operationally associated with a shutter release button. As a consequence, when the release switch repeats the ON-OFF operation within a short period of time due to the operations of the shutter release button, the spindle motor also repeats starts and stops.

When the spindle motor is restarted after the start as described above, there is presented such a problem that the power consumption is increased.

Furthermore, in order to record the image signal into the rotary magnetic recording medium such as a magnetic disc at a field or frame rate, it is necessary to perform high speed rotation at a constant speed as will be described hereunder. As a consequence, when the start and stop of the spindle motor are repeated, there is a problem that excessive time is needed until a predetermined rotation number required for recording the image signal is reached, whereby there is a possibility of losing shutter chances.

SUMMARY OF THE INVENTION

An object of the present invention is to provide an electronic still camera wherein the photographing mode can be changed over from the normal mode for still-photographing by use of the optical finder provided on the main body of the camera to the electronic view finder mode (hereinafter referred to as an "EVF mode") for still-photographing by use of the electronic view finder, or vice versa.

Another object of the present invention is to provide an electronic still camera wherein the photographing mode can be changed over from the normal mode for still-photographing by use of the optical finder provided on the main body of the camera to the movie still mode for still-photographing by use of the electronic view finder and for outputting the video signal to the outside through an interface, or vice versa.

A further object of the present invention is to provide an electronic still camera wherein the power consumption can be decreased, and, even if the release operations are performed a plural number of times and continuously, once the means for driving the rotary magnetic recording medium is started, a predetermined rotation number required for recording the image signal can be reached from the starting time in a short period of time.

To achieve the above-described objects, the present invention contemplates an electronic still camera comprising means for recording an image signal into a rotating rotary recording medium, image sensing means for photographing an image of a subject and accumulating image signals commensurate to the image of the subject, means for making exposure of the image of the subject to the image sensing means in response to an exposure command, and record control means for controlling the exposure means, the recording means and the image sensing means, for making exposure to the image sensing means to read out the image signal from the image sensing means and causing the rotary recording medium to record the image signal, wherein the electronic still camera includes mode change-over means which can change over the photographing mode from the normal mode for observing the subject by use of an optical finder provided on the main body of the camera and releasing the normally closed exposure means for a period of time required for the exposure to make exposure of the image of the subject to the image sensing means to the EVF mode for making exposure of the image of the subject to the image sensing means through the normally open exposure means by use of an electronic finder to observe the subject, closing the exposure means in response to an exposure command, and subsequently, releasing the exposure means for a period of time required for the exposure to make exposure of the image of the subject to the image sensing means, or vice versa, and the record control means controls the exposure means in accordance with the photographing mode selected in response to a mode change-over signal.

According to another aspect of the present invention, the electronic still camera includes lock detecting means for detecting that rotation of the rotary recording medium becomes steady, and mode change-over means for changing over the photographing mode from the normal mode for resetting and starting a synchronous signal generator to drive the image sensing means in response to this lock detection signal to the movie still mode for steadily rotating the spindle motor in synchronism with the synchronous signal generator, outputting a video signal to the outside through an interface and recording a still image into the rotary recording medium in response to an exposure command, and the record control means controls the exposure means, the recording means and the image sensing means in accordance with the photographing mode selected in response to a mode change-over signal.

According to a further aspect of the present invention, rotation control means controls driving means, which rotates the rotary recording medium and produces a frequency signal commensurate to the rotational speed, so as to be started in response to a starting command and steadily rotate the rotary recording medium at a predetermined speed in response to the frequency signal, and, after the rotation control means starts the driving means in response to a starting command by operating means, the rotation control means controls the driving means in such a manner that, even if a start stopping command is issued by the operating means, the rotatably driving action of the driving means is not stopped until at least a predetermined period of time elapses upon issuing of the start stopping command.

BRIEF DESCRIPTION OF THE DRAWINGS

FIG. 5 is a circuit diagram showing a mode change-over signal generating circuit for producing a mode change-over signal when the electronic still camera is equipped with the EVF adapter or the movie adapter;

FIGS. 6(A) and 6(B) are front and side views showing the states where the EVF adapter is mounted onto the main body of electronic still camera;

FIGS. 6(C) and 6(D) are a front and a side views showing the states where the movie adapter is mounted onto the main body of the electronic still camera;

DESCRIPTION OF THE PREFERRED EMBODIMENT

A preferred embodiment of the electronic still camera according to the present invention will hereunder be described in detail with reference to the accompanying drawings.

Figure 1:
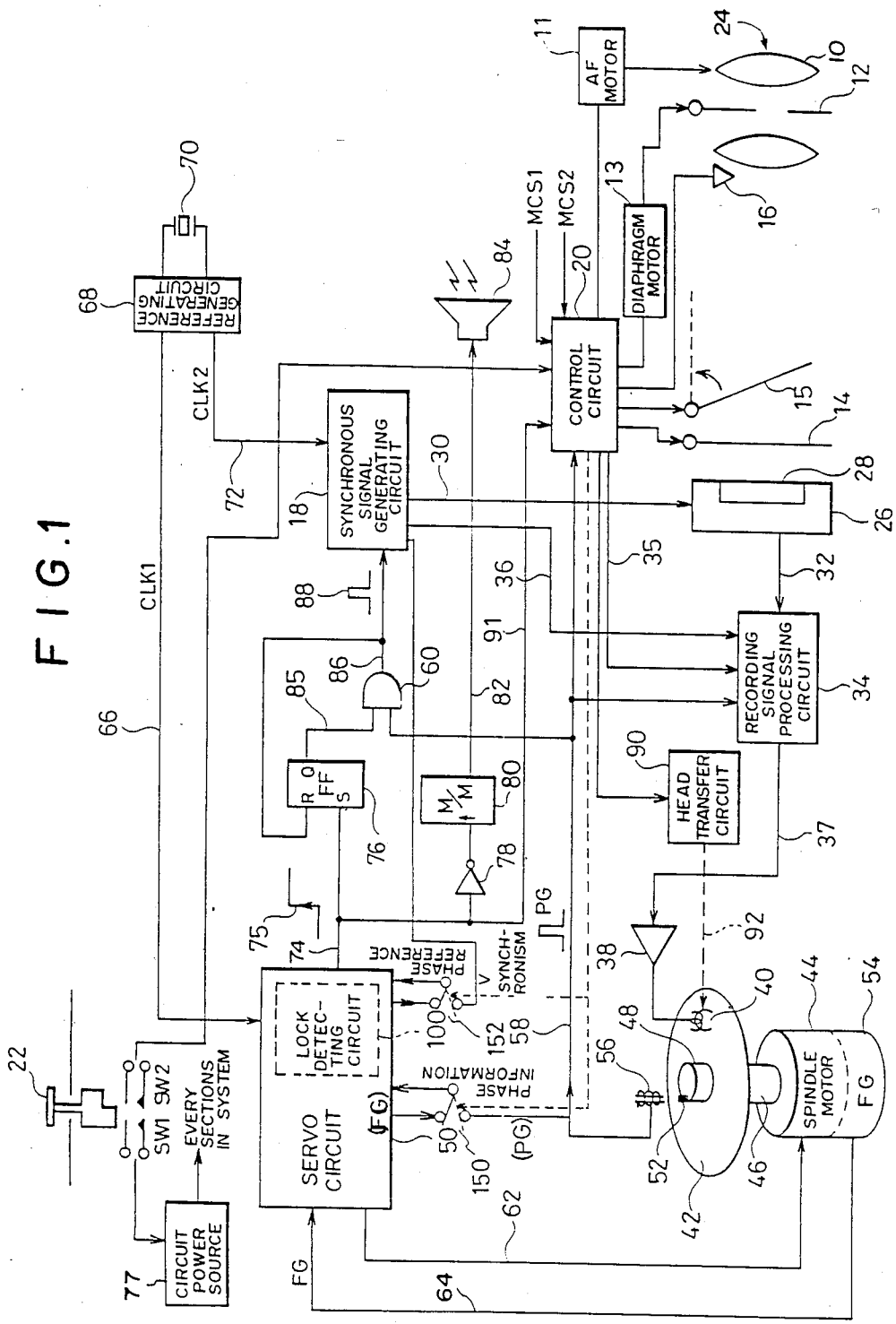
FIG. 1 is a block diagram showing the arrangement of one embodiment of the electronic still camera according to the present invention.

Referring to FIG. 1, the electronic still camera in the embodiment of the present invention has an image sensing optical system 24 including a taking lens system 10 for forming an image of a subject, a diaphragm 12 and an optical shutter 14. Out of the image sensing system 24, the taking lens system 10 is connected to a control circuit 20 through an auto focus motor (hereinafter referred to as an "AF motor") 11, and the diaphragm 12 is connected to the control circuit 20 through a diaphragm motor 13. A light measuring element 16 is provided in a light path of the image sensing optical system 24, and a detection output from the light measuring element 16 is taken into the control circuit 20 as brightness information of the subject. A mirror 15 is the mirror for leading a reflected light from the subject to an optical finder, not shown. The mirror 15 is controlled by the control circuit 20 in such a manner that the mirror 15 is normally located at a position indicated by a solid line, and sprung up to a position indicated by a dotted line during exposure. In association with the exposure control, the control circuit 20 controls the measuring element 16, a switch SW2 operable in accordance with a shutter release button 22, and the shutter 14 and the diaphragm 12 in accordance with a synchronous signal generating circuit 18.

In this embodiment, the shutter release button 22 performs a two-step stroke. In the first step of the stroke, a switch SW1 is closed, and a circuit power source 77 is operated in accordance therewith, whereby the power source is connected with every section of the system. With this arrangement, a motor 44 for driving a magnetic disc 42 as being a rotary recording medium is started in response to a driving signal from a servo circuit 50 which will be described hereunder, and the taking lens system 10 is driven in the direction of the optical axis by the AF motor 11 which has received a control circuit 20, so that automatic focusing can be performed.

Further, in the second step of the stroke of the button 22, the control circuit 20 acts to perform the shutter release, photographing and recording. With this arrangement, the power consumption of the power source such as a battery can be avoided.

Additionally, mode change-over signals MCS1 and MCS2 for changing over the photographing mode is adapted to be inputted into the control circuit 20, as will be described hereunder, the mode change-over signals MCS1 and MCS2 are adapted to be produced before an electronic view finder adapter (hereinafter referred to as an "EVF adapter") or a movie adapter is mounted onto the main body of camera.

In the electronic still camera according to this embodiment, photographing can be carried out in various photographing modes including the normal mode, EVF mode, movie still mode and movie camera mode.

When the still photographing is performed by use of the optical finder of the main body of the electronic still camera, the normal mode is set, when the EVF adapter for use of the electronic view finder is mounted onto the main body of the camera, the normal mode is changed over to the EVF mode, and, when the movie adapter is mounted, the normal mode or the EVF mode is changed over to the movie mode including the movie still mode and the movie camera mode.

Provided on a focal plane of the optical system 24 is a solid state image sensing device 26 such for example as a charge coupled device (CCD) having a secondary image sensing cell array, which accumulates image signals commensurate to the image of the subject formed on an image sensing surface 28 in response to driving signals including a vertical synchronous signal and a horizontal synchronous signal, which are delivered from the synchronous signal generating circuit 18 through a control line 30, and outputs to an output line 32 as a serial signal.

The output line 32 of the solid line image sensing device 26 is connected to a recording signal processing circuit 34. The recording signal processing circuit 34 is the circuit which frequency-modulates an image signal outputted from the solid state image sensing element 26 by the raster scanning and outputs to an output line 37 as a modulated image signal having a predetermined format in accordance with a driving signal delivered from the synchronous signal generating circuit 18 through a control line 36 and including a vertical synchronous signal, a horizontal synchronous signal and the like, phase pulses PG to be described hereunder, and further, a recording command signal delivered from the control circuit 20 through a control line 35. This output line 37 is connected to a magnetic recording head 40 through a recording amplifier 38.

The magnetic recording head 40 is an electromagnetic transducing element which is carried by a head transfer mechanism indicated conceptionally by a dotted line 92, transferred onto a vacant track of the magnetic disc 42 by a head transfer circuit 90, and record an image signal onto the vacant track. The head transfer circuit 90 is controlled by the control circuit 20. The magnetic disc 42 has a core 48, which is detachably mounted onto a rotary shaft 46 driven by the spindle motor 44, and steadily rotated in a predetermined direction by the motor 44, a frequency generator (FG) 54 and the servo circuit 50.

The magnetic disc 42 is constructed such that 50 tracks are recorded on a magnetic recording disc of a diameter as small as about 47 mm for example, at a track pitch of about 10 μm, i.e. the width of the track of about 50~60 μm and the width of the guard band of about 50~40 μm. The motor 44 steadily rotates the magnetic disc 42 at a rotational speed N of 3600 rpm for example, so that the image signal can be recorded at a field or frame rate.

The core 48 is provided with a phase generator 52 for generating a phase pulse PG through a predetermined reference rotation phase (angle) per turn of the disc 42. Provided adjacent the core 48 is a detection coil 56, which is the detector for outputting phase pulses PG to a signal line 58 when the phase generator 52 passes by the coil 56. This signal line 58 is connected to the control circuit 20, the signal processing circuit 34 and one of input terminals of an AND gate 60.

The servo circuit 50 is the motor control circuit, which feeds a driving current for the motor 44 to a connecting line 62, and has a phase lock loop (PLL) for controlling the rotational speed and the rotational phase of the motor 44 in accordance with a frequency signal FG generated in a signal line 64 by the frequency generator and a reference clock CLK1 received by a signal line 66 from a reference generating circuit 68. As the PLL control circuit, an integrated circuit for controlling a motor such for example as MODEL TC9142P manufactured by Tokyo Shibaura Electric Co., Ltd. is used.

In the frequency generator 54 of this embodiment, the repetitive frequency of the signal FG is 1/integer of the frequency of a color subcarrier of the image signal and sufficiently higher than that of the phase pulses PG. For example, a value 20 times higher is set.

The reference generating circuit 68 is the circuit which has a crystal oscillating element 70 for generating a clock of a stabilized frequency, declines the clock to a reference clock CLK2 of 14.3 MHZ which is produced at an output 72, and further divides into a frequency (3.58 MHZ) corresponding to the color subcarrier, CLK1 of which frequency is generated at the output 66.

Figure 2:
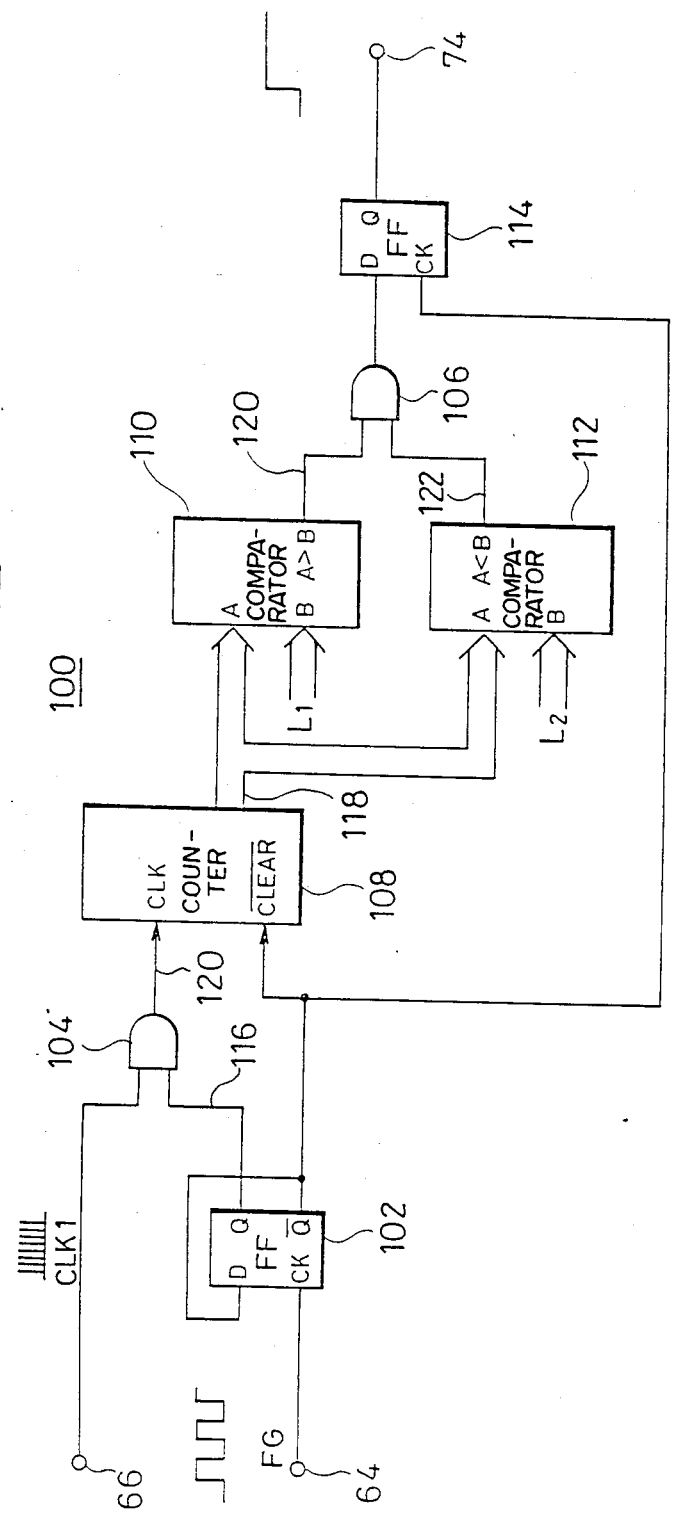
FIG. 2 is a block diagram showing an example of the arrangement of a lock detecting circuit in the embodiment shown in FIG. 1.

The servo circuit 50 has a lock detecting circuit 100. The lock detecting circuit 100 counts cycles or frequencies of the frequency signal FG by use of the reference clock CLK1, and the motor 44 maintains a predetermined rotational speed N within a predetermined tolerance. Namely, the lock detecting circuit 100 is the circuit for detecting whether the "locked" state is present or not. FIG. 2 shows an example of arrangement thereof.

Referring to FIG. 2, in the lock detecting circuit 100, flip-flops 102 and 114, AND gates 104 and 106, a binary counter 108, and comparators 110 and 112 are connected to one another as shown.

Figure 3:
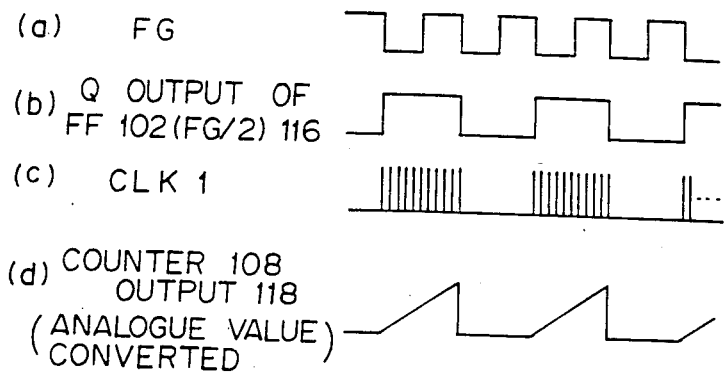
FIGS. 3(a-d) is a timing chart showing signal wave forms appearing at various sections of the circuit shown in FIG. 2.

The lock detecting circuit 100, as apparent from FIG. 3 showing the operating timing thereof, is the circuit wherein, the frequency signal FG (Refer to FIG. 3(a)) received by the signal line 64 is ½ divided in the flip-flop 102, the resultant output 116 is used to count the cycles of the frequency signal FG, and, when the cycles thus accounted are included within a predetermined range L (Refer to FIG. 4), an output 74 is set on the high level.

More specifically, one of inputs 116 of the AND gate 104 is energized by a signal (FIG. 3(b)) obtained by ½ dividing the frequency signal FG, and, only when the input 116 is on the high level, the reference clock CLK1 of the other 66 of inputs appears at an output 120 (FIG. 3(c)). The counter 108 counts the same and outputs the counted data to an output 118 (FIG. 3(d)). The counter 108 is reset when the flip-flop 102 is reset.

Figure 4:
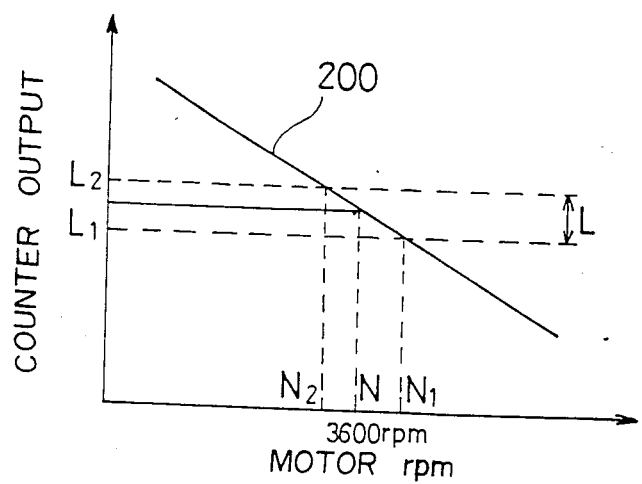
FIG. 4 is a graphic chart explaining the action of the circuit shown in FIG. 2.

The two comparators 110 and 112 are the circuits which compare the counted data 118 with reference values L1 and L2,, respectively, and, a weighted logical comparison circuit is used, such for example as a MODEL TC4063BP/BF manufactured by Tokyo Shibaura Electric Co., Ltd. As shown in FIG. 4, these reference values L1 and L2 are set as centered about the predetermined steady rotational speed N, e.g. 3600 rpm so as to define a predetermined lock range L of the rotation of the motor 44. It is advantageous to set this range L to a time period of about 2H (H=horizontal scanning period) for example.

The value of the output data 118 from the counter 108 is inversely proportional to the rotational speed of the motor 44, whereby the relationship therebetween is plotted as a straight line 200 shown in FIG. 4. As a consequence, when the output data 118 is within the range L, outputs 120 and 122 from both comparators 110 and 112 come to be on the high level, and an output from the AND gate 106 comes to be on the high level. As a consequence, the flip-flop 114 is set and the output 74 therefrom comes to be on the high level. This is a lock detection signal 75 indicating that rotation of the motor 44 is "locked" at the predetermined rotational speed.

The output 74 from the lock detecting circuit 100 and a set input S of the flip-flop 76 are connected to a monostable circuit (MM) 80 through an inverter 78. An output 82 from the monostable circuit (MM) 80 is connected to an audible signal generator 84 formed of a piezo-electric element for example, and, when the output 74 from the lock detecting circuit 100 is changed from the high level to the low level, the generator 84 is energized for a predetermined period of time, an audible warning is issued from the generator 84. Additionally, in place of the audible warning or in addition thereto, a visible indicator for outputting a visible indication may be used.

On the other hand, this lock signal 75 can be fed to the control circuit 20 through a control line 91.

A Q output 85 from the flip-flop 76 is connected to another input of an AND gate 60, and an output 86 from the latter and a reset input R of the flip-flop 76 are connected to a reset input of the synchronous signal generating circuit 18. As apparent from this arrangement, when the output 74 from the lock detecting circuit 100 comes to be on the high level, namely, the lock detection signal 75 is outputted, the flip-flop 76 is set and one of the inputs 85 of the AND gate 60 is energized. As a consequence, thereafter, the phase pulses PG initially detected by the coil 56 pass the AND gate 60 and, are inputted into the synchronous signal generating circuit 18 as reset pulses 88, whereby the circuit 18 is reset.

Furthermore, analogue switches 150 and 152 are the switches for changing over from phase input information to phase reference signal or vice versa, which are inputted to the servo circuit 50 for servo-controlling the spindle motor 44 depending upon whether the normal mode or the movie still mode, and switched by a control signal from the control circuit 20. In the normal mode, the switches 150 and 152 are located at positions indicated by solid lines, as the phase input information, the signal FG is selected, and, as the phase reference signal, an internal reference signal is selected. Further, in the movie still mode, the switches 150 and 152 are switched to positions indicated by dotted lines, as the phase input information, the signal PG is selected, and as the phase reference signal, a synchronous signal outputted from the synchronous signal generating circuit is selected. As described above, in the normal mode, the synchronous signal generating circuit 18 is reset by the reset pulses 88 on the basis of the signal FG, and, by this reset operation, a vertical synchronous signal outputted from the synchronous signal generating circuit 18 comes into synchronism with the signal FG. In contrast thereto, in the movie still mode, the servo circuit 50, namely, the rotation of the spindle motor 44 can come into synchronism with the vertical synchronous signal.

The synchronous signal generating circuit 18 is the circuit for generating various periodical control signals from the reference clock CLK2 of the clock input 72, and outputs these signals to the control lines 30 and 36. For example, outputted to the control line 30 are a picture element clock of 15.7 KHz, for driving image sensing cells of the image sensing element 26 to output accumulated charges to the control line 30 and a sensor driving signal including a synchronous signal and the like. Furthermore, outputted to the control line 36 are a recording control signal for controlling recording signal processing circuit 34 and synchronous signals such as a vertical synchronous signal of 60 $H_z$ and a horizontal synchronous signal.

The synchronous signal generating circuit 18 is reset to the initial state by the reset pulses 88. As a consequence, only if the reset time is made definite, thereafter, various control signals can be outputted in preset cycles under the phase thus made definite. In this embodiment, these control signals and the synchronous signals are outputted to the control lines 30 and 36 in such a manner that the vertical synchronous signal is located at a position after a lapse of a predetermined period of time, e.g. a time period of about 7H, a static image signal of 1 unit from the aforesaid position, e.g. 1 field (1 V) can be recorded in a track of the magnetic disc 42. As a consequence, unless there are considerable fluctuations in the rotation of the magnetic disc 42, the vertical synchronous signals thereafter occur in synchronism with the pulses PG with a substantial delay of 7H. As this synchronous signal generating circuit 18, MODEL MN6064 manufactured by Matsushita Electric Industrial Co., Ltd., for example, is used.

Description will hereunder be given of a mode change-over signal generating circuit for generating the mode change-over signals MCS1 and MCS2 for changing over the photographing mode from the normal mode to the EVF mode or the movie mode when the main body of electronic still camera is mounted thereonto with the EVF adapter or the movie adapter, with reference to FIG. 5. Referring to FIG. 5, provided in the main body of camera 300 is a mode change-over signal generating circuit 310, which is constituted by comparators 312 and 314, inverters 316 and 318, an AND gate 320 and resistors R1~R4. If the resistance values of the resistors R1~R4 are shown by the same reference characters for convenience's sake, then such relations are established that R1=R2=R3 and R4>R1+R2+R3. Inverted input terminals of the comparators 312 and 314 are grounded through the high resistor R4, and non-inverted input terminals have voltages $V_2$ and $V_1$ respectively which are obtained by dividing a power voltage $V_{cc}$ by the resistors R1~R3. A terminal 322a of an internally threaded type connector 322 is connected to inverted input terminals of the comparators 312 and 314, and a terminal 322b is grounded.

On the other hand, an EVF adapter 400 is provided with an externally threaded type connector 410, a connector pin 410b thereof is grounded and a connector pin 410a is supplied thereto with a voltage $V_2'$ obtained by dividing the power voltage $V_{cc}$ by the resistors R5~R7. Furthermore, a movie adapter 500 is also provided with an externally threaded type connector 510, a connector pin 510b of the connector 510 is grounded, and a connector pin 510a is supplied thereto with a voltage $V_1'$ obtained by dividing the power voltage $V_{cc}$ by the resistors R5~R7.

The voltages $V_1$, $V_1'$, $V_2$, $V_2'$ thus set have the relations of $V_1 < V_1' < V_2 < V_2' < V_{cc}$. Because of this, when the EVF adapter 400 or the movie adapter 500 are not connected to the main body of camera 300, outputs from the comparators 312 and 314 are on the high level. As a consequence, outputs from the inverter 316 and the AND gate 320 come to be on the low level, whereby the mode change-over signals MCS1 and MCS2 are not outputted to the control circuit 20.

Subsequently, when the EVF adapter 400 is mounted onto the main body of camera 300, voltages at the inverted input terminals of the comparators 312 and 314 come to be $V_2'$. Because $V_2' > V_2 > V_1$, outputs from the comparators 312 and 314 are inverted.

As a result, only the output from the inverter 316 comes to be on the high level, whereby the mode change-over signal MCS1 is outputted to the control circuit 20.

On the other hand, when the movie adapter 500 is mounted onto the main body of camera 300, voltages at the inverted input terminals of the comparators 312 and 314 come to be $V_1'$. Because of the relations of $V_1 < V_1' < V_2$, only the output from the comparator 314 is inverted from the high level to the low level, and the output from the comparator 312 remains on the high level. As a result only the mode change-over signal MCS2 is outputted from the AND gate 320 to the control circuit 20.

As described above, in the control circuit 20, from the combinations of the output conditions (high level or low level) between the mode change-over signals MCS1 and MCS2, judgment is made as to which adapter is mounted on the main body of camera 300, whereby various controls are carried out in accordance with the photographing mode concerned.

Here, in the state where the movie adapter 500 is mounted onto the main body of camera 300, either the movie still mode or the movie camera mode may be selected. This selection is performed by the operation of a mode switch, not shown, which is provided on the movie adapter 500.

The movie adapter 500 converts image output signals (brightness signal and color difference signal R−Y and B−Y) into video signals, and converts an external source power into a voltage of a predetermined level and supplies power to circuit portions in the main body of camera 300.

Additionally, as the video signal output, a video signal for the electronic view finder is outputted.

FIGS. 6(A1) and 6(A2) are the front and the side views showing the states where the EVF adapter 400 is mounted onto the main body of camera 300. FIGS. 6(B1) and 6(B2) are the front and the side views showing the states where the movie adapter 500 is mounted onto the main body of camera 300.

Figure 7:
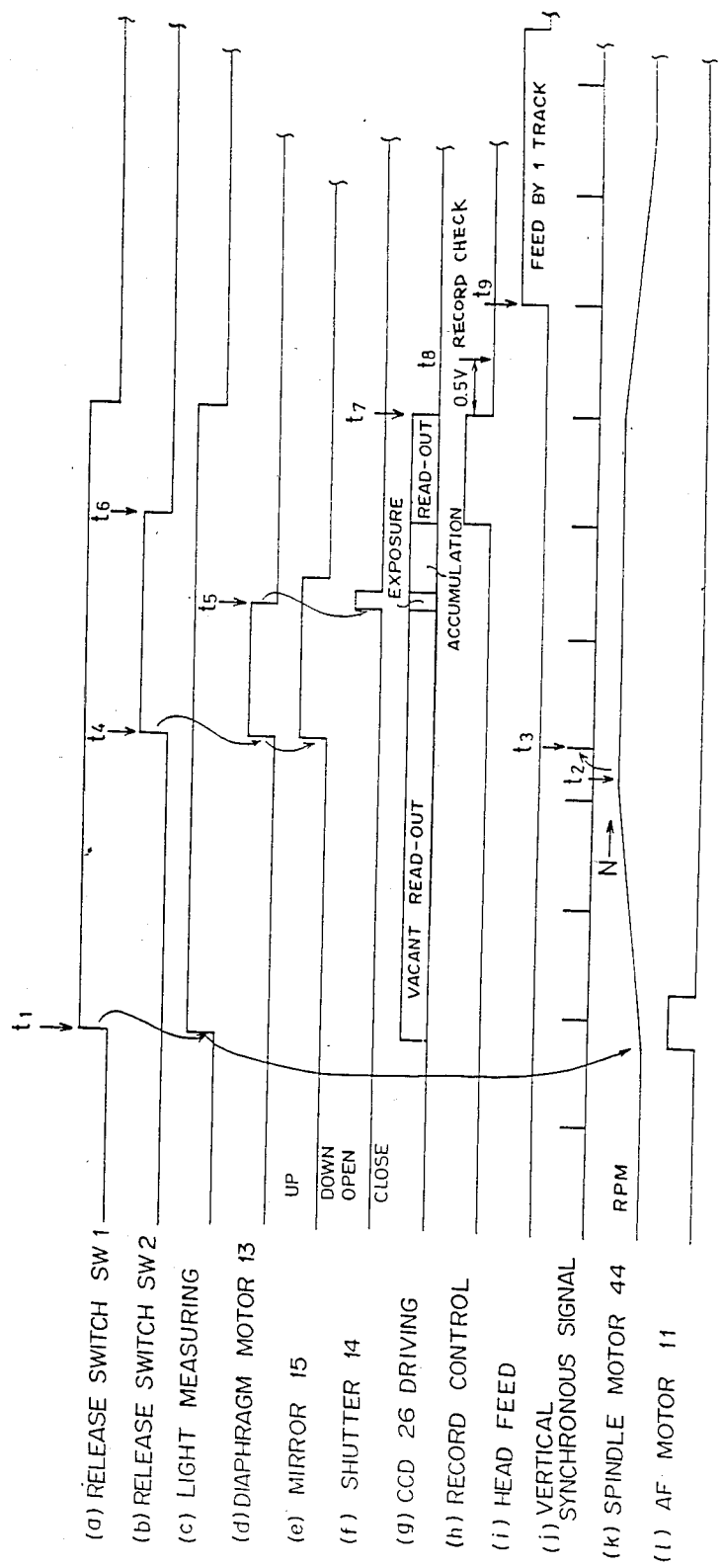
FIGS. 7(a-l) is a timing chart showing the action of the electronic still camera in the normal mode.
Figure 8:
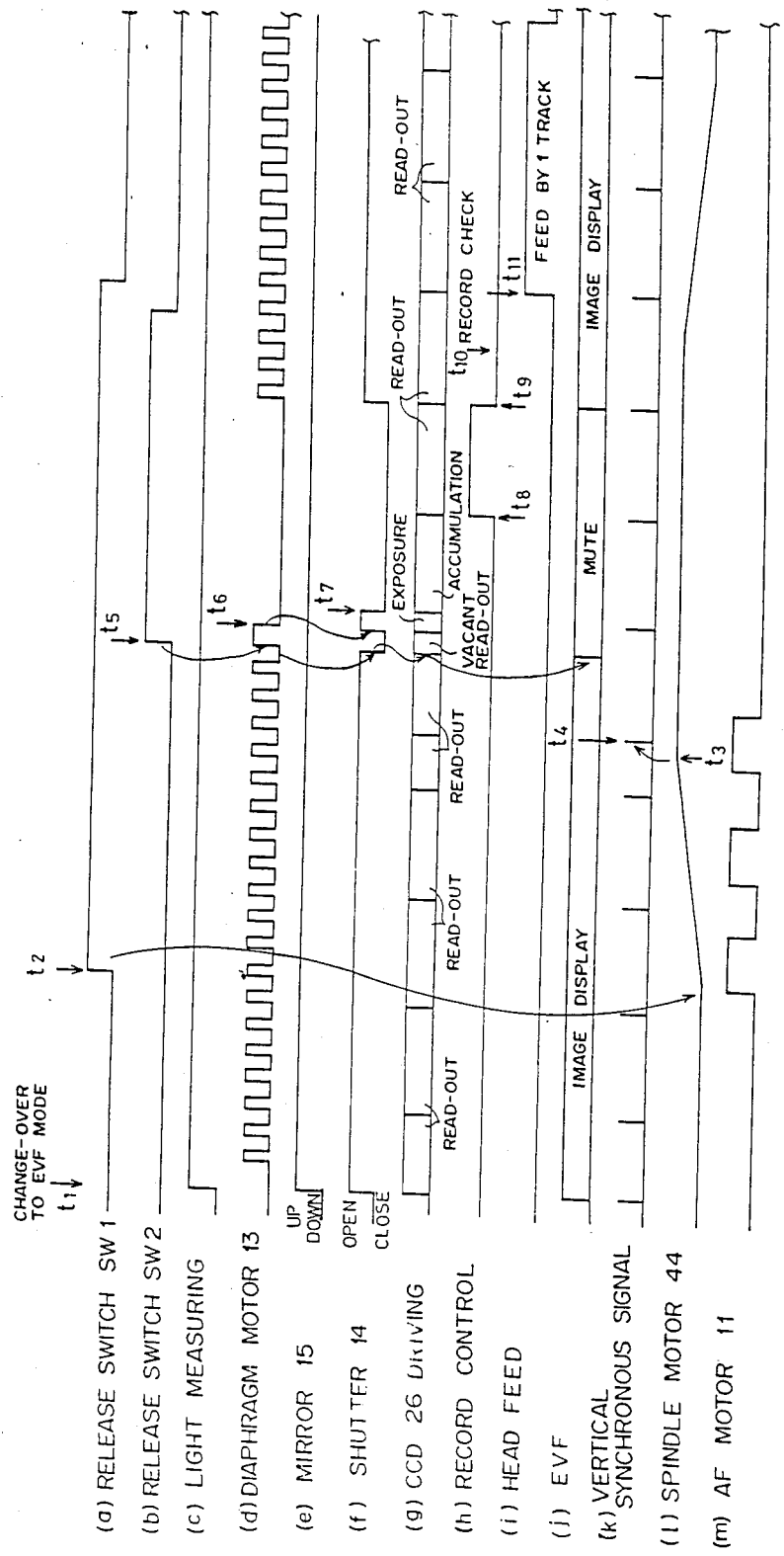
FIGS. 8(a-m) is a timing chart showing the action of the electronic still camera in the EVF mode.
Figure 9:
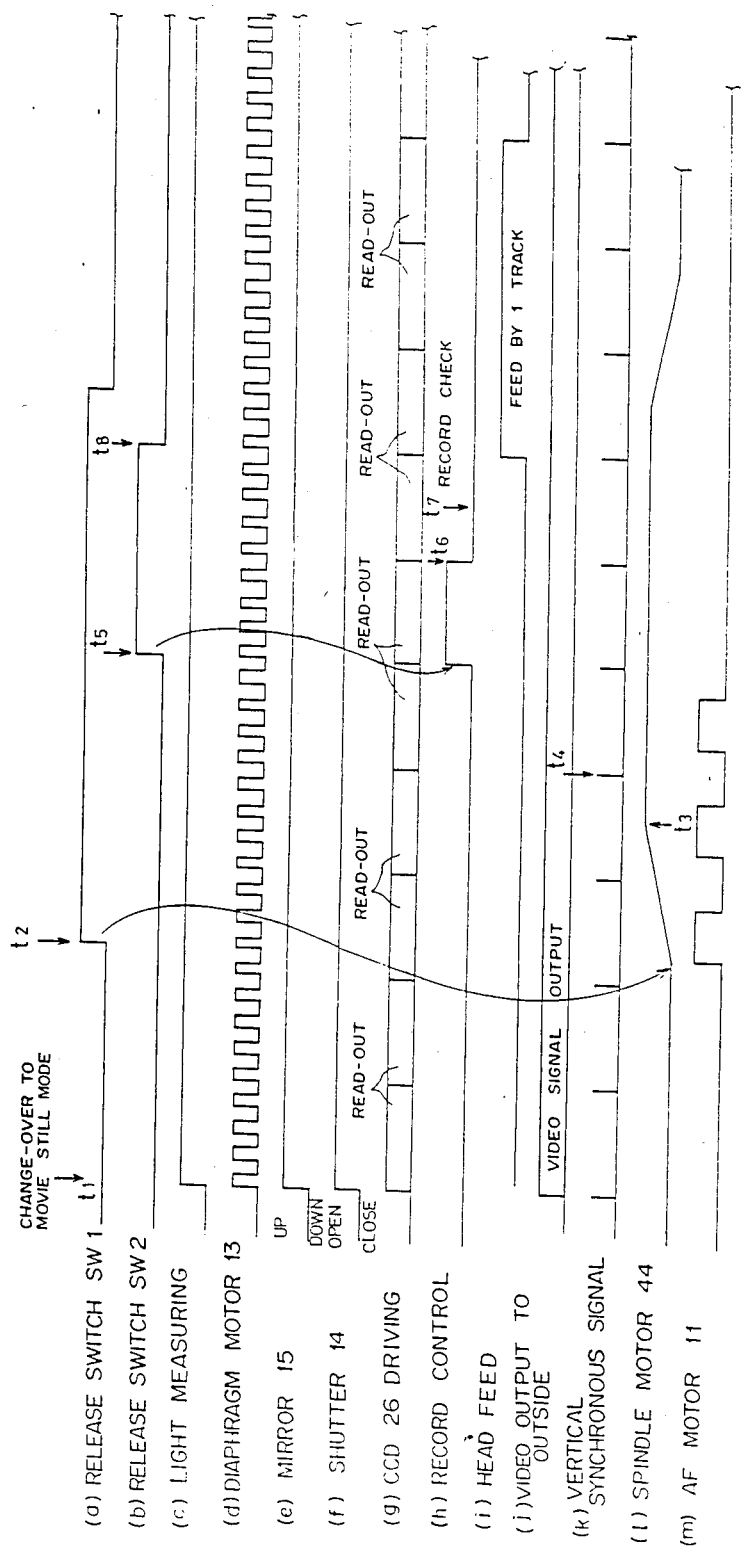
FIGS. 9(a-m) is a timing chart showing the action of the electronic still camera in the movie still mode.

Action of the electronic still camera according to the present invention will hereunder be described with reference to the timing charts shown in FIGS. 7 to 9. In FIG. 7, an example of action of the normal mode is shown. Referring to the drawing, when the release button 22 is pushed at the time t1, the switch SW1 is closed (FIG. 7(a)). At this time, the source power is supplied to every circuit portion of the system, brightness information of the subject is taken into the control circuit 22 from a light measuring element 16, and the spindle motor 44 starts rotation in response to a driving signal from the servo circuit 50 (FIG. 7(k)). Simultaneously with this, the AF motor 11 is continuously driven in response to a control signal from the control circuit 20, moves the taking lens system 10 in the direction of optical axis, and performs an automatic focusing (FIG. 7(l)). Here, the automatic focusing by the AF motor 11 can be continuously controlled from the time of the start of the spindle motor 44 to the time of the lock, however, once the taking lens system is focalized on the subject, the driving of the AF motor 11 is stopped at this time unless the subject moves.

As the rotational speed of the spindle motor 44 is increased, the coil 56 starts outputting the phase pulses PG, and the repetitive cycle thereof will be gradually shortened. Along with this, the cycle of the frequency signal FG generated by the frequency generator 54 is shortened, and, shortly, the "locked" state is brought about. More specifically, when the rotational speed approaches the predetermined value N and the counted value of the counter 108 becomes included within the predetermined lock range L, the lock signal 75 is outputted from the lock detecting circuit 100, whereby the flip-flop 76 is set and one of inputs of the gate 60 is energized. Furthermore, this lock signal 75 is inputted into the control circuit 20 through the control line 91.

In this state, when the phase pulse PG reaches from the coil 56 at the time t2 for example, the output from the AND gate 60 comes to be on the high level, whereby the reset pulses 88 are outputted to the synchronous signal generating circuit 18, so that the vertical synchronous signal is reset at the time t3 (FIG. 7(j)), and, after the time t3, the vertical synchronous signal is outputted substantially in synchronism with the phase pulses PG.

On the other hand, the control circuit 20 can read in a signal (FIG. 7(b)) showing the state of the switch SW2 in accordance with the input of the lock signal 75.

Subsequently, as shown in FIG. 7(b), when the release button 22 is further pushed in at the time t4 and the release switch SW2 is closed, the control circuit 20 rotatably drives the diaphragm motor 13, whereby aperture control is started in such a manner that the diaphragm 12 becomes a predetermined stop value on the basis of the brightness information of the subject obtained from the light measuring element 16, and the mirror 15 is sprung up, so that the preparation for the exposure can be completed (FIGS. 7(d) and 7(e)). Further, when the driving of the diaphragm motor 13 is stopped at the time t5, the shutter 14 is released, the image sensing surface 28 of the solid state image sensing device 26 is exposed and the image signal commensurate to the image of the subject formed on the image sensing surface 28 is accumulated in the solid state image sensing device 26, and thereafter, the read-out is performed in synchronism with the vertical synchronous signal. In synchronism with the time period of read-out of the solid state image sensing device 26 and in response to a control signal from the control circuit 20, the recording signal processing circuit 34 records the image signal read out of the solid state image sensing device 26 into the magnetic disc 42, and thereafter, the content recorded in the magnetic disc 42 is checked after a lapse of a time period of 0.5 V upon completion of the recording, i.e. the time t8 (FIG. 7(h)). Further, at the time t9, the head 40 is fed by one track in the forward direction by a head transfer circuit 92 (FIG. 7(i)).

Action of the EVF mode will hereunder be described with reference to the timing chart shown in FIG. 8. Referring to the drawing, when the EVF adapter 400 is mounted onto the main body of camera 300 and the power switch, not shown, of the EVF adapter is closed at the time t1, the mode change-over signal MCS1 is outputted from the mode change-over signal generating circuit in the main body of camera 300 to the control circuit 20, whereby the source power is supplied to every circuit portion. As a result, the light measuring element 16 starts inputting the brightness information of the subject to the control circuit 20, the diaphragm motor 13 is rotatably driven in response to a control signal from the control circuit 20, whereby the aperture control is started (FIGS. 8(c) and 8(d)). Furthermore, simultaneously with this, the mirror 15 is sprung up in response to a control signal from the control circuit 20, the shutter 14 is released, and, the driving of the solid state image sensing device 26 is started, whereby the image of the subject is formed on the image sensing surface 28 of the device 26 (FIGS. 8(e), 8(f) and 8(g)). From this time t1 on, the image signals per unit of field are read out from the solid state image sensing device 26 in synchronism with the vertical synchronous signal (FIG. 8(k)) outputted from the synchronous signal generating circuit 18 to the solid state image sensing device 26, whereby the image of the subject is displayed on a display screen of the EVF adapter 400 (FIGS. 8(g) and 8(j)).

If the photographer idenitifies the image of the subject on the display screen of the EVF adapter 400, and thereafter, pushes the release button 22 at the time t2, then the release switch SW1 is closed (FIG. 8(a)), whereby the spindle motor 44 is rotatably driven and the AF motor is also rotatably driven periodically, so that the taking lens system 10 is automatically focused (FIGS. 8(l) and (m)).

Further, when the rotational speed of the spindle motor 44 is increased, it approaches the predetermined value N similarly to the case of the normal mode and the counted value of the counter 108 becomes included within the predetermined lock range L, the lock signal 75, not shown, is outputted from the lock detecting circuit 100 at the time t3 whereby the flip-flop 76 is set and one of the inputs of the gate 60 is energized. In this state, the vertical synchronous signal is reset at the time t4 when the phase pulses PG are inputted from the coil 56 into the gate 60 (FIGS. 8(l) and 8(k)). From the time t4 on, the vertical synchronous signal is outputted from the synchronous signal generating circuit 18 substantially in synchronism with the phase pulses PG. Thereafter, when the release button 22 is further pushed in at the time t5 and the release switch SW2 is closed (FIG. 8(b)), the diaphragm motor 13 is driven for the final stop, and at the same time, the shutter 14 is closed (FIGS. 8(c), 8(d) and 8(f)).

Further, the read-out of the image signal from the solid state image sensing device 26 is stopped (FIG. 8(g)), and input of the image signal into the EVF adapter 400 is stopped (FIGS. 8(g) and 8(j)). When the final stop is performed and the diaghragm motor 13 is stopped at the time t6 (FIG. 8(d)), the shutter 14 is released, and the image of the subject is formed on the image sensing surface 28 on the solid state image sensing device 26 (FIGS. 8(f) and 8(g)). Subsequently, the shutter 14 is closed at the time t7, exposure of the solid state image sensing 26 to the image sensing surface 28 is ended (FIGS. 8(f) and 8(g)). Thereafter, the signal charge is accumulated in the solid state image sensing device 26, and the read-out of the image signal, i.e. the accumulated charge per unit of field in synchronism with the vertical synchronous signal is synchronism with the vertical synchronous signal is performed. However, the image signals read out of the solid state image sensing device 26 during the time period between the times t8 and t9 out of the read-out cycles are recorded into a predetermined track of the magnetic disc by the magnetic head 40 through the recording signal processing circuit 34, and, after a lapse of a predetermined time (for example, 0.5 V) from the time t9, the content of recording is checked at the time t10 (FIG. 8(h)).

On the other hand, the rotatable driving of the diaphragm motor 13 is started at the time t9 when the recording of the image signals is completed, the aperture control is performed (FIG. 8(d)), the shutter 14 is released (FIG. 8(f)), input of the image signal is started in the EVF adapter 400, and the image of the subject is displayed on the display screen (FIG. 8(g)).

Further, at the time t11, the magnetic head 40 is forwarded in the forward direction by one track from the current track in response to a driving signal from a head transfer circuit 90 (FIG. 8(i)), and is prepared for the subsequent photographing As apparent from the foregoing, the differences of the taking action by the EVF mode from that of the normal mode are:

(1) The power supply to every circuit portion is performed at the time of change-over to the EVF mode while the power switch in the EVF adapter is closed;
(2) The light measuring of the subject is constantly performed from the time of the power supply;
(3) The aperture control is constantly carried out practically except the time period of recording;
(4) The mirror 15 is sprung up from the time of the power supply; and
(5) The shutter 14 is controlled so as to perform the operations of open→close→open→close temporarily. The operations are necessary and indispensable ones to constantly make the image of the subject identifiable before the photographing on the display screen of the EVF adapter.

Action of the movie still mode will hereunder be described with reference to the timing chart shown in FIG. 9. Referring to FIG. 9, at the time t1, the movie adapter 500 is mounted onto the main body of camera 300, a power switch, not shown, of the movie adapter is closed, and the movie still mode is selected by a mode switch provided on the movie adapter 500, whereby the switches 150 and 152 are changed over to the positions indicated by the dotted lines in response to a control signal from the control circuit 20, the phase input information in the servo circuit 50 is changed over from the FG reference to the PG reference, and further, the phase reference signal is changed over from the internal reference signal to the vertical synchronous signal outputted from the synchronous signal generator. And, the mode change-over signal MCS2 is outputted from the mode change-over signal generating circuit in the main body of camera 300 to the control circuit 20, whereby the source power is supplied to every circuit portion. As a result, take-in of the brightness information of the subject is started from the light measuring element 16 to the control circuit 20, and the diaphragm motor 13 is rotatably driven in response to a control signal from the control circuit 20, whereby the aperture control is started (FIGS. 9(c) and 9(d)). This aperture control is continued as far as the movie still mode is specified. Simultaneously with this, the mirror 15 is sprung up in response to a control signal from the control circuit 20, the shutter 14 is released, and the driving of the solid state image sensing device 26 is started, whereby the image of the subject is formed on the image sensing surface of the image sensing device 26 (FIGS. 9(e), 9(f) and 9(g)). From this time t1, on, the image signal is read out per unit of field from the solid state image sensing device 26 in synchronism with the vertical synchronous signal (FIG. 9(k)) outputted from the synchronous signal generating circuit 18 to the solid state image sensing device 26, the image signal is converted into the video signal in the movie adapter 500 and outputted to the outside, and the video signal is also outputted to the electronic view finder, not shown, which is mounted on the main body of camera 300 (FIGS. 9(g) and 9(j)).

As described above, the image of the subject is displayed on the electronic view finder. After the image of the subject is identified in the electronic view finder by the photographer, the release button 22 is operated at the time t2 to close the release switch SW1 (FIG. 9(a)), whereby the spindle motor 44 is rotatably driven and the AF motor 11 is rotatable driven periodically, so that the automatic focusing of the taking lens system 10 can be performed (FIGS. 9(l) and 9(m)).

Further, when the rotational speed of the spindle motor 44 is increased, it approaches the predetermined value N similarly to the case of the normal mode and the counted value of the counter 108 becomes included within the predetermined lock range L the lock signal 75, not shown, is outputted from the lock detecting circuit 100 at the time t3. Thereafter, when the release button 22 is further pushed in to close the release switch SW2 at the time t5 (FIG. 9(b)), the image signal read out from the solid state image sensing device 26 during the time period of t5~t6 in synchronism with the read-out cycle of the image signal from the solid state image sensing device 26 is recorded into a predetermined track of the magnetic disc by the magnetic head 40 through the recording signal processing circuit 34, and the content of the recording is checked at the time t7 after a lapse of a predetermined period of time (for example, 0.5 V) from the time t6 (FIG. 9(h))

Further, when the release switch SW2 is released at the time t8, simultaneously with this, the magnetic head 40 is transferred by one track in the forward direction from the current track in response to a driving signal from the head transfer circuit 90, and prepared for the subsequent photographing (FIG. 9(i)).

As apparent from the foregoing, the differences of the photographing action of the movie still mode from that of the normal mode are:
(1) The power supply to every circuit portion is performed at the time of changing over to the movie still mode;
(2) The light measuring of the subject is constantly performed from the time of the power supply;
(3) The aperture control is constantly carried out;
(4) The mirror 15 is sprung up from the time of the power supply;
(5) The shutter 14 is constantly in the released position from the time of the power supply;
(6) The solid state image sensing device 26 is constantly controlled in such a manner that the signal charge, i.e. the image signal is read out in synchronism with the vertical synchronous signal, from the time of the power supply; and
(7) The spindle motor 44 is rotated in synchronism with the vertical synchronous signal outputted from the synchronous signal generating circuit.

These differences occur due to the need of the movie still mode for constantly outputting the video signal to the outside.

As described above, in this embodiment, the photographing in the normal mode, the EVF mode and the movie still mode can be performed.

As seen in the above examples of action of the respective modes, when the release button 22 is operated only once, the spindle motor 44 reaches the predetermined rotation number required for the recording of the image signal substantially within the predetermined period of time, and is prepared for starting the photographing action immediately.

Figure 10:
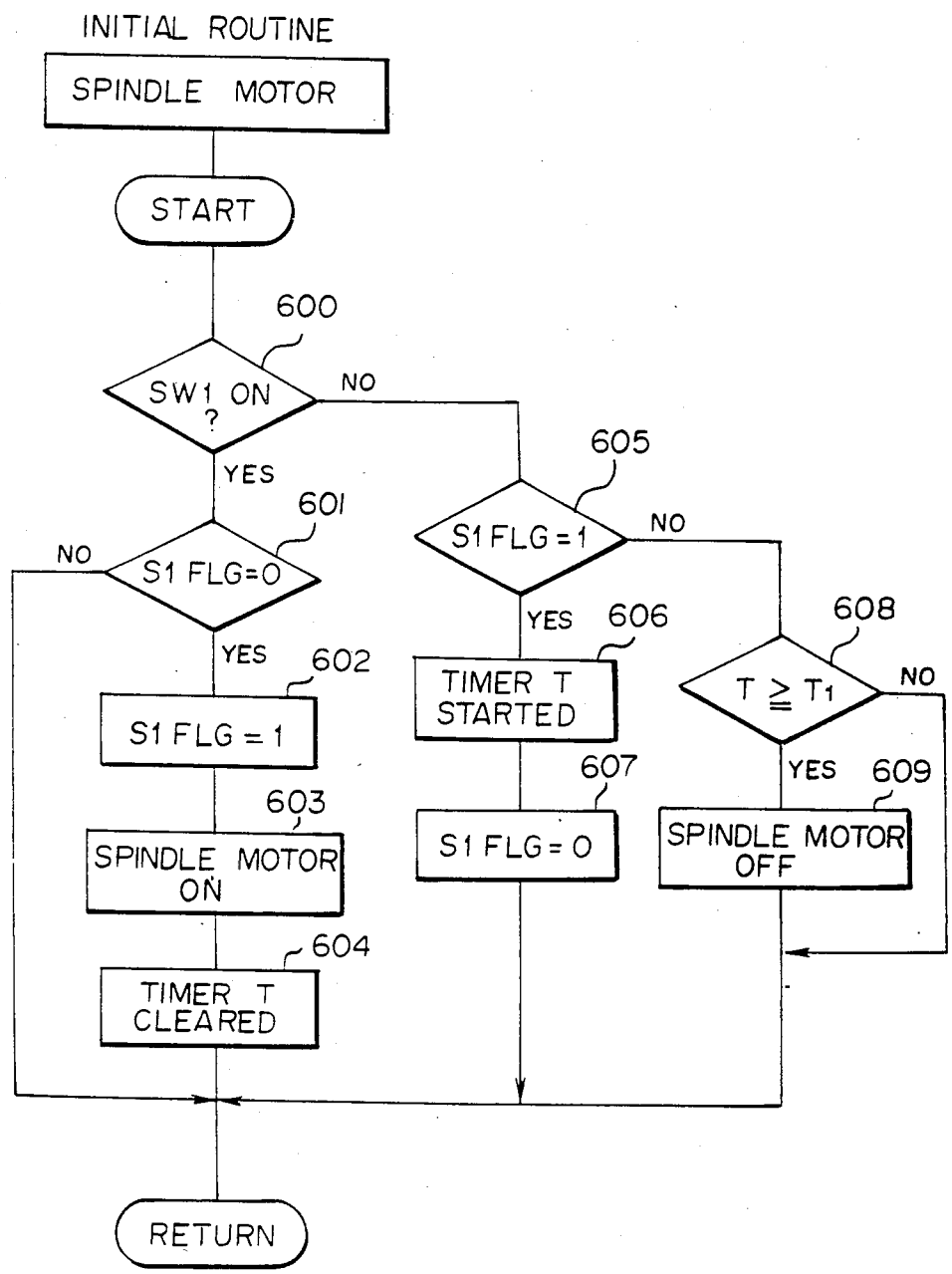
FIG. 10 is a flow chart showing the content of an interrupt routine carried out by a servo circuit.

Description will hereunder be given of the content of control of the spindle motor 44 by the servo circuit 50 when the release button 22 is operated a plural number of times with reference to the flow chart shown in FIG. 10.

An interrupt routine shown in FIG. 10 is started in synchronism with the vertical synchronous signal outputted from the synchronous signal generating circuit 18 in a preset cycle, for example, by a central processing unit (CPU) provided in the servo circuit 50, and carried out. In FIG. 10, when a program is started, judgment is made as to whether the release switch SW1 is ON or not in Step 600.

When it is judged that the release switch SW1 is ON, judgment is made as to whether a flag S1FLG is reset or not in Step 601. Here, the flag S1FLG refers to the flag indicating that the release switch SW1 is ON. When it is judged that the flag S1FLG is set, execution of this routine is completed as it is, and the interrupt routine is restored.

On the other hand, when it is judged that the flag S1FLG is reset in Step 601, the flag S1FLG is set in Step 602, subsequently, a driving current is supplied to the spindle motor 44 to start the motor 44 in Step 603, a timer T is cleared, and execution of this routine is completed. Subsequently, when the pushing to the release button is released by the photographer, it is judged that the release switch SW1 is turned OFF by an interrupt request, which occurs after the release of the pushing, in Step 600. Subsequently, in Step 605, it is judged that the flag S1FLG is set because the flag S1FLG has been set in Step 602, the timer T is started in Step 606, and the flag S1FLG is reset in Step 607, thus completing execution of the routine. Here, the timer T is the timer used for judging as to whether the predetermined period of time T1 (In this embodiment, t1=8 sec) has elapsed after the release switch SW1 is turned ON initially to start the spindle motor 44, or not. The driving current is supplied from the servo circuit 50 to the spindle motor 44 during this stage where the processing of the Steps 600→605→606→607 is carried out.

Further, it is judged that the release switch SW1 is turned OFF by an interrupt request, which occurs subsequently, in Step 600, and thereafter, judgment is made as to whether the flag S1FLG is set or not in the subsequent Step 605. Since the flag S1FLG has been reset by the excecution of Step 607 due to the preceding interrupt request of this routine, it is judged that the flag S1FLG is reset in Step 605 this time, whereby the routine proceeds to Step 608. In Step 608, judgment is made whether a period of time $T_1$ ($T \geq T_1$) has elapsed after the timer T is started. When $T < T_1$ in Step 608, excecution of this routine is completed as it is, and the subsequent interrupt request is waited for.

Further, when it is judged that the release switch SW1 is OFF in Step 600, subsequently, the flag S1FLG is reset in Step 605, and thereafter, it is judged that $T \geq T_1$ in Step 608, the routine proceeds to Step 609.

In Step 609, since the period of time $T_1$ has elapsed from the time when the release switch SW1 is changed from ON to OFF after the spindle motor is started, the supply of driving current from the servo circuit 50 to the spindle motor 44 is stopped, thus completing execution of this routine.

Additionally, there is made no description of the processing of the case where the release button SW1 is turned ON initially, then turned OFF, and further, turned ON. However, even in this case, before a lapse of the period of time $T_1$ from the time when the release switch is changed from ON to OFF initially, as apparent from a flow shown in FIG. 10, only the flag S1FLG repeats the set state and the reset state, and the driving current is continuously supplied to the spindle motor 44.

As has been described hereinabove, this embodiment is of such an arrangement that, once the spindle motor 44 is started, thereafter, even if a start stopping command is issued, until a predetermined period of time elapses from the time when the start stopping command is issued, the rotatable driving of the spindle motor 44 is not stopped, according to this embodiment, even when the release button is operated a plural number of times, operations of start→stop→start are not repeated, so that the power consumption can be decreased. Furthermore, once the spindle motor is started, the rotatable driving is continued regardless of the release operations during a predetermined period of time. Therefore, even if the release button is operated a plural number of times, the motor can reach the rotational speed needed for recording the image signal after the start of the motor in a short period of time, so that the shutter chances are not lost.

What is claimed is:

1. An electronic still camera comprising:
   recording means for recording an image signal into a rotating rotary recording medium;
   image sensing means for photographing an image of a subject and accummulating image signals commensurate to the image of the subject;
   exposure means for exposing the image of the subject to said image sensing means, said exposure means having an open position and closed position, said exposure means being set in said closed position; and
   record control means for controlling said exposure means, said recording means and said image sensing means, for opening said exposure means to expose an image to the image sensing means for causing the image signal from said image sensing means to be read, and for causing said rotary recording medium to record the image signal;
   wherein said electronic still camera has mode change-over means for changing a photographing mode between a first mode and an electronic view finder mode, said first mode including observing the subject by use of an optical view finder provided on a main body of the camera and in response to an exposure command opening said closed exposure means for a period of time required to expose the image of the subject to said image sensing means, said electronic view finder mode including exposing the image of the subject to said image sensing means through said exposure means in the open position by use of an electronic view finder to observe the subject, closing said exposure means in response to an exposure command, and subsequently, opening said exposure means for a period of time required to expose the image of the subject to said image sensing means, and said record control means controls said exposure means in accordance with the photographing mode selected in response to a mode change-over signal.

2. The electronic still camera as set forth in claim 1, wherein:
   said record control means includes driving means for rotating said rotary recording medium and generating a frequency signal commensurate to a rotational speed of said rotary recording medium and rotation control means for controlling said driving means to start said driving means in response to a starting command and to steadily rotate said rotary recording medium at a predetermined speed in response to said frequency signal; and
   said electronic still camera has means for resetting and starting a synchronous signal generator to drive said image sensing means in response to a lock detection signal indicating that rotation of said rotary recording medium is steady.

3. The electronic still camera as set forth in claim 1, wherein, in the electronic view finder mode, said record control means performs the control such that the exposure is made proper by a light quantity feedback automatic diaphragm during observation of the subject, and the exposure is made proper by adjusting the f-stop and the shutter speed during photographing.

4. The electronic still camera as set forth in claim 1, wherein said mode change-over means changes over to the electronic view finder mode in association with the connection through a pin when the electronic view finder adapter is mounted to the main body of the camera.

5. An electronic still camera comprising:
   driving means for rotating a rotary recording medium and generating a frequency signal commensurate to the rotational speed of said rotary recording medium;
   rotation control means for controlling said driving means by starting said driving means in response to a starting command and to steadily rotate said rotary recording medium at a predetermined speed in response to said frequency signal;
   recording means for recording an image signal onto said rotating rotary recording medium;
   image sensing means for photographing an image of a subject and accummulating image signals commensurate to the image of the subject;
   exposure means for exposing the image of the subject to said image sensing means; and
   record control means for controlling said exposure means, said recording means and said image sensing means, for opening said exposure means to expose an image to the image sensing means, for causing the image signal from said image sensing means to be read and for causing said rotary recording medium to record the image signal;

wherein said electronic still camera has lock detecting means for detecting that rotation of said rotary recording medium is steady and mode change-over means for changing from a first mode to a movie still mode, said first mode including resetting and starting a synchronous signal generator to drive the image sensing means in response to a lock detection signal from the lock detection means, said movie still mode including steadily rotating a spindle motor in synchronism with said synchronous signal generator, outputting a video signal to the outside through an interface and recording a still image into said rotary recording medium in response to an exposure command, and said record control means controls said exposure means, said recording means and said image sensing means in accordance with the mode selected in response to a mode change-over signal.

6. An electronic still camera comprising:

driving means for rotating a rotary recording medium and generating a frequency signal commensurate to the rotational speed of said rotary recording medium;

operating means for instructing the start of said driving means;

rotation control means for controlling said driving means by starting said driving means in response to a starting command and to steadily rotate said rotary recording medium at a predetermined speed in response to said frequency signal;

recording means for recording an image signal onto said rotating rotary recording medium;

image sensing means for photographing an image of a subject and accumulating image signals commensurate to the image of the subject;

exposure means for exposing the image of the subject to said image sensing means; and recording control means for controlling said exposure means, said recording means and said image sensing means, for opening said exposure means to expose an image to said image sensing means, for causing said image signal from said image sensing means to be read, and for causing said rotary recording medium to record the image signal;

wherein said rotation control means controls in such a manner that, after said driving means is started in response to a starting command issued from said operating means, and even if a start stopping command is issued, the rotatable driving of said driving means is not stopped until a predetermined period of time elapses at least from the time when the start stopping command is issued.

* * * * *